Feb. 15, 1966
D. J. DERMODY ETAL
3,234,731
VARIABLE THRUST DEVICE AND INJECTOR
Filed Jan. 10, 1962
2 Sheets-Sheet 1
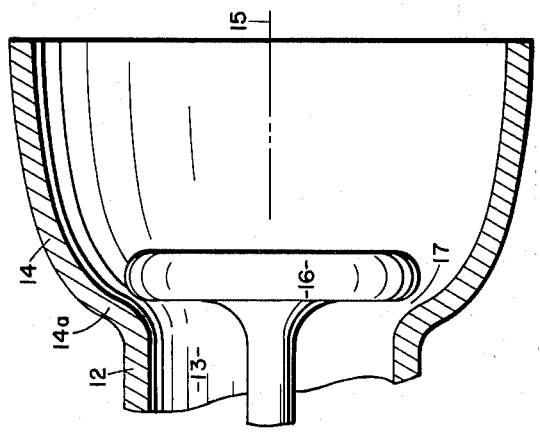
INVENTORS
DENNIS J. DERMODY
DIMITRI P. BUERGIN
CAMILLE SPEISMAN
BY
*Lowell A. Turner*
AGENT

United States Patent Office 3,234,731
Patented Feb. 15, 1966

3,234,731
VARIABLE THRUST DEVICE AND INJECTOR
Dennis J. Dermody, Canoga Park, Camille Speisman, Tarzana, and Dimitri P. Buergin, Woodland Hills, Calif., assignors to North American Aviation, Inc.
Filed Jan. 10, 1962, Ser. No. 166,452
14 Claims. (Cl. 60—35.6)

This invention relates to a variable thrust device and injector. More particularly, it relates to a thrust device wherein variable control is achieved in both the thrust chamber and the propellant injector portions thereof.

There have been many attempts to achieve an accurate and controllable thrust producing device, e.g., a rocket engine. While various of such devices have achieved a measure of success none has been fully successful. Particularly as related to rocket engines, difficulty has been experienced in obtaining variable thrust control over a full thrust range, especially with a maintenance of stable combustion performance and control of mixture ratio. Attempts to achieve such features have also resulted in systems of extreme weight and complexity. Space requirements in vehicles to which they have been adapted have also been excessive. Additionally, movable propellant injector portions of such thrust control devices have been limited to a short stroke resultant from the necessity of making such stroke dependent upon or inseparably associated with propellant impingement angle. This is particularly true in the usual annular type device. It has also been virtually impossible to obtain a variable area injector capable of complete sealing upon shutdown.

A prime object of the present invention is to provide a thrust device having variable thrust characteristics operable over a wide thrust range without a performance penalty associated with conventional fixed or variable thrust systems.

Another object is to provide a variable thrust system having minimum weight, in structural simplicity and which requires minimum space in the vehicle to which it is adapted.

Another object is to provide a rocket engine which will be self-adjusting in flight conditions to provide efficient performance regardless of flight altitude.

Yet another object is to provide a variable thrust device wherein combustion chamber pressure is substantially constant regardless of thrust level.

A further object is to provide a propellant injector wherein the stroke of the adjustable portion thereof is of sufficient length to provide accuracy and efficiency of control.

A still further object is to provide an injector wherein problems of eccentricity are obviated.

An additional object is to provide an injector wherein freedom of design is possible in achieving variation in mixture ratio control and propellant impingement angles.

Other objects of invention will become apparent from the following description taken in connection with the accompanying drawings, in which:

FIG. 1 is a partial longitudinal vertical section of the variable thrust device;

FIG. 2 is an enlarged section of a portion of the FIG. 1 injector poppet taken from position 2 in FIG. 1, the injector being shown in the closed position;

FIG. 3 illustrates the poppet portion of FIG. 2 in a partially open position;

Figure 5:
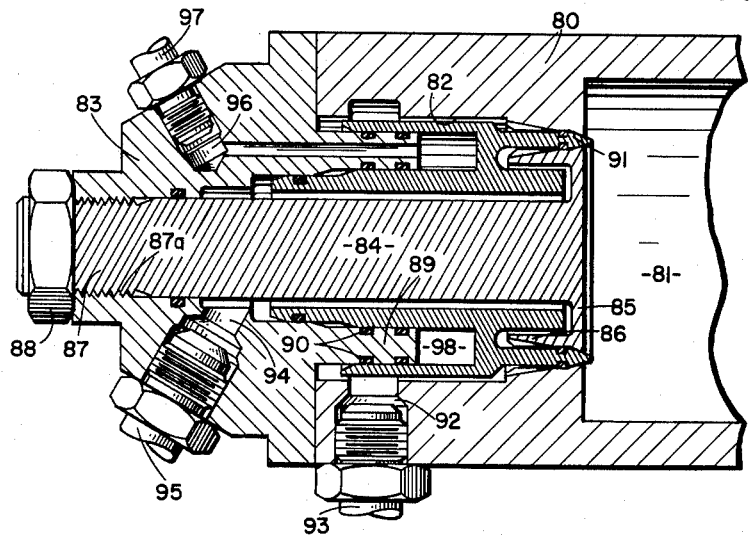
FIG. 5 is an enlarged section of the injector portion in an alternate configuration.

The variable thrust device of this invention is generally comprised of the combination of a thrust chamber, preferably of the expansion-deflection (E-D, see below) type, wherein a plug portion thereof is axially movable to vary the throat area and wherein a variable propellant injector portion includes a poppet axially movable within a propellant passage communicating with a combustion chamber portion of the thrust chamber. The propellant passage includes a plurality of lands and grooves, the grooves being tapered to eventually blend into the land surfaces near the outlet of the passage into the combustion chamber, and a poppet carrying spring actuated wiper rings slidable over the lands so as to accomplish propellant metering as the poppet is reciprocated.

FIG. 1 is illustrative of the inventive combination including the variable area nozzle and the variable injector. Therein a variable thrust device, e.g., a rocket engine, and so referred to hereinafter, is indicated by the numeral 10. Rocket engine 10 includes a body portion 11 which incorporates a wall 12 defining a combustion chamber 13. Attached to and extending essentially radially outward from an extremity of wall 12 is a nozzle 14. This nozzle, after initially extending essentially radially at 14a, curves into a more nearly axial direction, axis 15 being the axis of reference in this regard. Located within nozzle 14 adjacent the attachment of combustion chamber wall 12 and nozzle 14, is a plug 16 of greater diameter than the exit of combustion chamber 13. The overlapping region between nozzle portion 14a and end portions of plug 16 defines a throat 17. Plug 16 is attached to a shaft 18 disposed co-axially and adapted for reciprocation within body portion 11. A pressure balance plate 21 is adjustably affixed to the end of shaft 18 opposite plug 16 by means of screw threads 19 and nut 20. Plate 21 may include an extension 22 for guidance and dampening purposes. Pressure plate 21 is disposed within a cylinder 23 in body 11, its diameter being slightly less than that of the cylinder to enable reciprocation therein. A conventional seal, e.g., "O" ring 24, is retained within a peripheral groove in pressure balance plate 21 to prevent fluid by-pass. Extension 22 is similarly disposed within a second cylinder 25 for movement therein, a sealing ring 26 being disposed in a peripheral groove of the extension. An orifice 27 through extension 22 controls the flow of fluid to and from a damper cavity 27a, which is defined between plate 21 and shoulder 27b. A damper means is thus provided to smooth movements of plug 16 and prevent undesirable oscillations. A plug 28 threadedly installed in one end of body 11 provides an adjustable stop for pressure balance plate 21. A port 29 for pressurized fluid leads into cylinder 25 from an independent and conventionally controlled pressurized fluid source (not shown). The fluid is conducted through fluid line 30.

Figure 4:
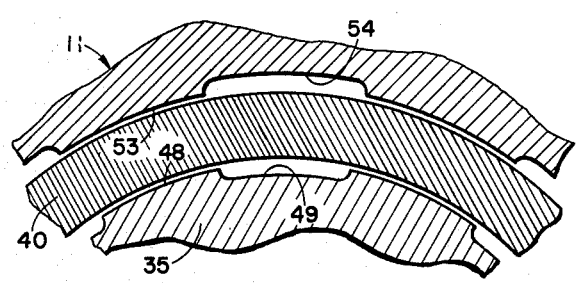
FIG. 4 is a fragmentary section taken along lines 4—4 of FIG. 2.

Concentrically and adjustably retained within body 11 and about shaft 18 is a tubular sleeve 31 through which shaft 18 is axially movable. Sleeve 31 is retained in its adjustable position by means of nut 32 upon threads 33 at one extremity of the sleeve, threads 33 being threadedly engaged in body 11. Affixed to the opposite extremity of sleeve 31 and usually integral therewith is a radially extending plate 34. An essentially cylindrical skirt 35 extends axially from the periphery of plate 34 in the direction of and substantially parallel to tubular sleeve 31. The external configuration of plate 34 and skirt 35 and the configuration of an internal wall of body 11 concentrically and adjacently surrounding cylindrical skirt 35 are described in detail hereinafter with respect to FIGS. 2–4.

Concentrically surrounding and adapted for axial reciprocation over tubular sleeve 31 is a slide member or poppet generally designated 40 and which includes an elongated sleeve portion 41. A cavity 41a is defined between sleeves 31 and 41, one of its ends being interconnected with the surrounding cavity region by a port 41b. Cavity 41a acts to dampen vibrations and stabilizes the operational positioning of poppet 40. A poppet head 42 upon one end of sleeve 41 includes one or more passages 43 therethrough for the transfer of liquid propellant. Surrounding a central portion of head 42 is a cylindrical metering head 44 extending in a concentric spaced relation from the central portion of poppet head 42. Metering head 44 includes one or more spring actuated metering control rings, usually in the form of conventional piston rings 45 and 46 (FIG. 2) in its internal and external surfaces. Rings 45 and 46 have built in spring factors. However, other conventional spring loading means may be used where the metering control structure is varied. For example, where flat structure is used in preference to cylindrical structure, flat wiper blades with coil or wave springs for urging them into contact with the surface to be wiped are also used. Metering head 44 is adapted to move axially within an annulus 47 (FIG. 3) defined between cylindrical skirt 35 and the noted internal wall of body 11. Annulus 47 opens into combustion chamber 13.

Figure 6:
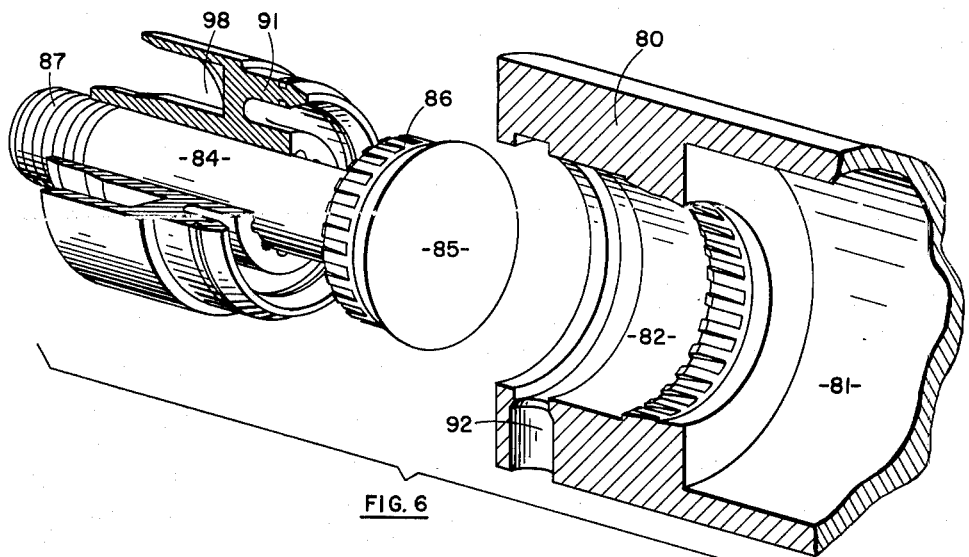
FIG. 6 is the perspective of a major portion of the FIG. 5 injector in partial section.

FIGS. 2 and 3 illustrate the metering structure of this invention. Metering head 44 is in its closed position in FIG. 2 and in a partially open position in FIG. 3. Cylindrical skirt 35 includes upon its outer periphery a series of lands 48 (best shown in the subcombination of FIGS. 4–6) spaced about the entire periphery by an alternate series of tapered grooves 49, sometimes referred to as ramped grooves. Grooves 49 diminish in depth to the position indicated as 50, at which position they terminate. There they blend into conformity with the surfaces of lands 48 either at the same axial positions, as shown in FIG. 6, or in a staggered sequence. The region of minimum depth is also sometimes convergent in its width to provide a more precise metering control at shutoff. A complete cylindrical sealing surface 51 of preferably greater length than rings 46 is defined between position 50 and a tapered guide surface 52 adjacent thereto. Guide surface 52 is disposed about the entire periphery of plate 34 as a portion of that structure at a pre-selected degree of taper dependent upon the impingement angle at which propellants exiting therefrom are desired to be directed.

Disposed upon an internal surface of body 11 and concentrically spaced from the skirt portions just described are a series of lands 53 and grooves 54 oriented in substantially the same manner as are lands 48 and grooves 49, but in an internal rather than an external surface. A cylindrical sealing surface 55 concentrically surrounding surface 51 is also provided, as is a tapered guide surface 56 disposed similarly to and convergent with guide surface 52. Tapered guide surface 56 may be tapered at any desired angle to facilitate proper propellant impingement. Metering head 44 includes a tip having tapered surfaces 57 and 58 complementary to surfaces 52 and 56, respectively.

The amount of propellant capable of by-passing piston rings 45 and 46 through grooves 54 and 49 when metering head 44 is in a particular selected position may be predetermined by the degree of taper of the grooves. It will be noted that the taper of groove 54 is more severe than that of 49. Hence, grooves 54 are capable of passing a greater volume of fluid than are grooves 49. Thus, the mixture ratio of two separate propellants flowing through the respective grooves may be predetermined by appropriately selecting the groove tapers. This is a feature of major significance in the present invention.

Body 11 contains a chamber 60 which is variously divided into propellant chambers 61 and 62 and intermediate control chamber 63 by a pair of concentric bellows members 64 and 65. One end of outer bellows 64 is sealed to body 11 and the opposite end is sealably connected to an external periphery of poppet head 42 for movement therewith. Bellows 65 is similarly attached to body 11 and to poppet head 42, interiorly of bellows 64. The attachments are made by welding, brazing, or other means capable of securing a complete seal between the various noted chambers. Were leakage to occur the ultimate possibility of propellant mixing in the control chamber 63 could lead to an explosion. Bellows 64 and 65 are of sufficient flexibility to facilitate the axial movement of poppet 40 while maintaining the noted seal characteristics.

Passages 66 and 67 respectively lead from lines 68 and 69 into chambers 61 and 62 for the delivery of propellants into those chambers from external sources (not shown). Passage 70 similarly leads from line 71 attached from a pressurized fluid source (not shown) to control chamber 63.

Operationally, the expansion-deflection type thrust chamber of FIG. 1 is peculiarly adaptable to the variable thrust device of the present invention. A full description of the E-D thrust chamber may be found in patent application Serial No. 27,128 entitled, "An Expansion-Deflection Thrust Chamber," and filed May 5, 1960. Through its utilization, operation over a wide range of chamber pressure-to-ambient pressure ($P_c/P_a$) ratios for a given exit area-to-throat area ratio ($A_e/A_t$) may be achieved without suffering the performance (thrust coefficient) losses inherent in a conventional nozzle. Conversely, the variable area of configuration of the basic expansion-deflection nozzle, as set forth herein, facilitates operation over a wide range of $A_e/A_t$ ratios for a given $P_c/P_a$ ratio. Hence, these two characteristics result in a system which will maintain higher performance over a wider range of throat areas and, therefore, thrust levels than is possible with a conventional variable throat area nozzle of the configuration commonly referred to as the plug or spike variety.

Unilke a conventional plug, the plug of the E-D nozzle used in this invention maintains a low and relatively constant pressure distribution on its downstream face over a wide operating range. For this reason it is possible to balance the force on the plug created by the chamber pressure distribution along its upstream face against a fixed reference pressure and, by allowing the plug to seek its own position, to maintain chamber pressure in a relatively narrow band over a wide thrust range. This facilitates the maintenance of efficient propellant injection and conserves propellant. Were a large downstream plug pressure present and subject to significant pressure changes over the operating range, as in a conventional plug, this would not be possible. Hence, during operation, plug 16 seeks its own most effective position resultant from the pressure distribution across its surface in the region of combustion chamber 13, as controlled by a constant reference pressure maintained in reference cylinder 25.

Combining a variable area injector with the variable area thrust chamber design further complements the capabilities of the variable area thrust chamber in obtaining a complete system with high operational integrity, controllable combustion stability, minimum weight and system complexity. Combustion stability control is enhanced by maintaining a high P across the injector, thereby maintaining a high injection velocity over the entire thrust range regardless of propellant flow volume. The space requirement of the vehicle to which the combination is adapted is also greatly reduced. Were each of the components to be assembled in a standard configuration, the space requirement would be roughly three times that required by the present combination. Through the utilization of the injector of this invention, the dual function of propellant injection and propellant flow throttling is accomplished in a single unit.

As distinguished from variable injectors of the prior art, the present injector is capable of operating with the much longer stroke and of providing propellant metering independent of impingement angle. In variable injectors of the prior art the relatively short poppet strokes result in limited accuracy of propellant control. Due to the necessity of using steep angles for adequate propellant impingement at the injector exit in such short stroke injectors, minute poppet movement causes rapid increases in propellant flow. For example, movement of the poppet a few thousandths of an inch changes the flow rate considerably and reduces the ability to provide adequate control. Such injectors are also highly susceptible to the build up of manufacturing tolerances. This results in eccentricities of the poppet and the annulus to which it is adapted. Due to the presence of fuel-rich mixtures on one side of the injector and oxidizer-rich mixtures at 180° out of the phase therewith under such conditions, the end results are an inferior mixture ratio control and radical changes in propellant flow rates and in the inability to achieve a complete seal around the entire poppet annulus at shutdown.

The present injector eliminates such detriments by providing a metering system capable of much more accurate control in varying the propellant flow. It also completely eliminates the eccentricity problem with its resultant mixing and sealing characteristics. The structural features responsible for this improvement are (a) the tapered or ramped groove configurations whereby incremental amounts of propellant flow variation may be accurately and easily achieved and (b) the utilization of piston-type wiper rings incorporated in the metering head to co-act with the lands and ramped grooves in achieving the propellant metering and in maintaining the complete accuracy of metering over the entire poppet stroke. This accuracy is consistent regardless of manufacturing eccentricities in either the poppet or the land configuration. Through incorporation of this injector concept, a considerably longer stroke may be utilized in controlling the injector from the closed to the full open position than was possible in prior art injectors. Additionally, the piston ring configuration enables a substantially complete shut-off of propellant when the rings are moved beyond the end of the metering grooves and into contact with the cylindrical sealing surfaces 51 and 55. It will be understood that the metering lands and grooves, rather than being located upon portions of body 11 and skirt 35, may be included upon opposite surfaces of poppet 40. In such configuration they are moved with poppet 40 over stationary piston rings retained in body 11 and cylindrical skirt 35. This reversal of positions may be accomplished without departing from the intended scope of the invention.

Since the metering orifices (tapered grooves) are controlled independently of the tapered guide surfaces, the guide surfaces can be disposed at equal angles or any combination of relative angles which will provide ideal impingement characteristics for maximum performance. In prior art, injectors of the variable type, the relationship of these angles has necessarily been fixed by the combination of impingement diameter, mixture ratio, and density of propellants. In distinction to these requirements, the guide surface angles of the present injector are fixed only by the factor of real importance, maximum performance. The designer utilizing the present variable injector is free to assign to propellant impingement angles that value which will give the propellants the best conditions for complete mixing, thereby providing the system with maximum efficiency capabilities.

In operation, reference pressure fluid under a pre-determined pressure is first introduced into cylinder 25 through port 29 and line 30 from a pressure source (not shown). In most rocket engine systems which employ fixed propellant tank pressures this reference pressure would most logically be achieved by using propellant as the reference fluid under storage tank pressure, the pressurization being applied by a pressure bottle, the propellant pumps, etc.

The fluid is introduced through line 30 which leads from the propellant tank to reference cylinder 25. A separate control fluid is also introduced into control chamber 63 through line 71 and passage 70 from a pressure source of pre-determined pressure. This pressure is controllable responsive to manual or automatic signals dependent upon operation altitude, thrust requirements, or other variables. The control system per se forms no part of the present invention. Either simultaneously or in a desired staggered sequence the propellants are introduced through lines 68 and 69 into passages 66 and 67 and subsequently into propellant chambers 61 and 62. The propellant entering chamber 61 traverses the external portion of bellows 64 and enters grooves 54. It is prevented from entering combustion chamber 12 by the presence of piston ring 45 sealably contacting surface 55. The propellant entering chamber 62 traverses bellows 65 and passages 43 and enters the spacial region between poppet head 42 and plate 34, from which position it then enters grooves 49 and is stopped by piston rings 46 which sealably contact surface 51. With the propellants in these areas, a force is exerted across the forward portion of poppet 40 and on bellows 64 and 65. This force, which tends to move poppet 40 to the left, is resisted by the controlled pressure within control chamber 63. As soon as the propellant pressures are sufficient to overcome the control pressure, poppet 40 moves leftward causing piston rings 45 and 46 to be removed from sealing surface 55 and 51 and to move over the surfaces of lands 53 and 48. The injector position is thereafter self-regulating through maintenance of the control pressure. As soon as a segment of grooves 54 and 49 are exposed to annulus 47 the propellants are enabled to by-pass the piston rings and enter the annulus. As they move through annulus 47 they are intercepted by tapered guide surfaces 52 and 56 and redirected such that they enter combustion chamber 12 at substantially the angles of the guide surfaces. They are then projected into impingement against one another at the impingement region indicated by numeral 72 (FIG. 3). Propellant ignition is spontaneous as the two propellants contact one another in the combustion chamber when hypergolic propellants are used. When hypergolic propellants are not utilized, ignition may be accomplished by an independent igniter, e.g., a conventional pyrotechnic igniter (not shown) inserted through combustion chamber wall 12. Upon initiation of combustion the pressure within combustion chamber 13 rises rapidly until the reference pressure in chamber 25 is equalized. This causes plug 16, shaft 18 and pressure balance plate 21 to move to the right until a balanced condition with respect to the reference pressure in cylinder 25 is attained. Throat region 17 is thus caused to open and combustion gases are allowed to escape through throat 17. They are then expanded around plug 16 into nozzle 14. The expanded gases are exhausted from the nozzle for the production of useful thrust. The pressure in combustion chamber 13 is, therefore, controlled by reference pressure within chamber 25.

Thrust control is achieved by varying the axial position of poppet 40. This is accomplished by changing the pressure within control chamber 63. In order to decrease total thurst the control pressure is increased. Propellant pressure acting upon the poppet is overcome by the increased forces acting internally of the bellows and the poppet is moved to the right. Piston rings 45 and 46 are thereby moved into new positions over more constricted groove regions, cutting down the total propellant flow entering the combustion chamber. This tends to reduce chamber pressure and allows plug 16 to move to the left until chamber pressure is reestablished. The area of throat 17 is thereby decreased and the total thrust is reduced.

Thrust increase is achieved by decreasing the pressure within control chamber 63. This allows propellant pressures to move poppet 40 to the left, exposing a greater groove area and increasing propellant flow. The increase in the volume of propellant entering combustion chamber 13 tends to increase combustion chamber pressure, thereby causing plug 16 to move to the right until initial chamber pressure is re-established. This opens throat 17 to a greater extent and results in an increased total thrust.

It is sometimes desirable to utilize the injector portion of this invention in such places, for example, as conventional thrust chambers or gas generators. In such event it is not necessary that the variable throat device and nozzle portions be utilized therewith. FIGS. 5 and 6 illustrate a typical injector embodiment utilized in such application. A body portion 80 includes a combustion chamber 81 and cavity 82 for accepting an injector poppet. A second body portion 83 is adapted for bolting or to be otherwise attached to body portion 80. A shaft 84 having an injector plate 85 and cylindrical skirt 86 attached thereto at one of its extremities is adjustably retained in body portion 83. This is typically accomplished by the engagement of threaded shank 87 with body threads 87a. Shaft 84 is locked in position by lock nut 88. Body portion 83 includes a cylindrical extension 89 having a series of annular grooves 90 in its outer and inner peripheries. Grooves 90 carry conventional O rings or piston rings for sealing purposes.

An injector poppet 91 is disposed within injector cavity 82 of body 80 and around cylindrical extension 89 in an axially movable relationship with respect to those parts.

A port 92 in body portion 80 is interconnected by line 93 to a first propellant source. Port 94 in body portion 83 is interconnected by line 95 to a second propellant source. Another port 96 in body portion 83 is interconnected by line 97 to a control pressure source. Since the propellant and control pressure sources, per se, provide no portion of this invention they are not illustrated. Port 96 leads to a control cavity 98 defined between poppet 91 and cylindrical extension 89. The injector portion of this configuration is identical with that described above respecting FIGS. 1–4, injector poppet 91 carrying a pair of piston rings. The lands and grooves over which the piston rings are adapted to move are defined as integral of body portion 80 and cylindrical skirt 86.

In a sequence of operation, control pressure is conducted to control cavity 98 through port 96 and line 97 and propellants are introduced to opposite sides of the injector poppet through ports 92 and 94. Thereafter, the injection and injector control sequence is quite similar to that described above respecting the operational sequence of the injector portion of the device of FIGS. 1–4. The position of injector poppet 91 is maintained or changed by controlling the pressure in cavity 98 in cooperation with the pressure applied to the poppet by the propellants, thereby balancing the pressures so as to stabilize the poppet in the desired position.

The injector embodiments of FIGS. 1 and 5 are obviously interchangeable in their supporting structures with minor design variations.

FIG. 6 illustrates perspectively and in a semi-exploded manner body portion 80, injector shaft 84 with injector plate 85, cylindrical skirt 86, and poppet 91. This provides a clear illustration of the cylindrical character and the concentric relationship of these parts in their preferred embodiment. However, it is to be understood that the invention is not limited to concenric configurations. As noted above, injectors having axially movable flat plates as the poppets, the poppets including the land and groove configuration, together with appropriate spring loaded wiper ring members, are considered to be within the scope of this invention. It is also sometimes desirable that one side of the metering land and groove configuration of the injector be utilized for monopropellant and/or for metering valve applications. Additionally, the incorporation of a plurality of the described injectors into a single thrust device is also sometimes desirable and fully within the intended scope of the invention. Therefore, although the invention has been described and illustrated in detail, it is to be clearly understood that the same is by way of illustration and example only and it is not to be taken by way of limitation, the spirit and scope of this invention being limited only by the terms of the appended claims.

We claim:
1. A fluid metering device comprising
a body portion having a pair of spaced surfaces defining a fluid passage therebetween, said passage having an inlet end and an outlet end,
said surfaces including means defining a plurality of alternately positioned lands and tapered grooves within said passage,
said tapered grooves being of minimum depth at a position adjacently spaced from said outlet end,
a poppet adapted for movement within said passage, and
metering control means carried by said poppet and adapted to contact said surfaces to cover and uncover varying amounts of said groves as said poppet is moved.
2. The fluid metering device of claim 1 wherein
said surfaces include regions between said outlet end and said grooves sealably contactable by said metering control means for preventing fluid flow through said outlet, and including guide surfaces at said outlet end extending from said spaced surfaces at predetermined converging angles.
3. A fluid metering device comprising
a body portion including a cylindrical surface and a concentrically spaced surface,
said surfaces cooperatively defining an annular fluid passage having an inlet end an an outlet end,
guide surfaces convergingly extending from said cylindrical surfaces at said outlet end
each said surface including means therein defining a groove beginning at a region adjacently spaced from said guide surfaces and tapering toward said inlet end,
an annular poppet positioned for axial movement along said annular passage,
annular groove means in said poppet,
piston rings in said annular groove means in forcible contact with said cylindrical surfaces,
said piston rings positioned on said poppet for movement over said cylindrical surfaces and said grooves to vary flow cross-sectional area of said annular passage.
4. A fluid metering device comprising
a body portion,
means defining a first cavity of said body,
means defining a second cavity in axial communication with said first cavity,
a double ended poppet disposed for axial movement within said first cavity,
a first end of said poppet extending at least into adjacency with said second cavity,
tapered groove means between said first cavity means and said poppet,
said groove being of minimum depth adjacent said second cavity, wiper means relatively movable over said tapered groove in conjunction with movements of said poppet to cover and uncover portions of said groove,
poppet control means communicating with said poppet for positioning same responsive to an independent control signal, and
passage means in said body for admitting fluid to said grove means.
5. The fluid metering device of claim 4 wherein
said cavities and said poppet are cylindrically shaped, and said wiper means is at least one piston ring.
6. The fluid metering device of claim 4 wherein
said first cavity and said poppet are cylindrically shaped, said tapered groove means defines a plurality of grooves in said first cavity, and said wiper means is at least one piston ring carried by said poppet.

7. The fluid metering device of claim 4 wherein
said tapered groove means comprises a plurality of tapered grooves in said first cavity means,
a skirt member is supported within said body in spaced relation from said first cavity means,
    said skirt member including means defining a plurality of tapered grooves in a surface thereof adjacent said poppet,
said poppet including a metering head adapted for axial movement between said first cavity means and said skirt members,
    said metering head including means defining peripheral grooves in opposite sides thereof, and
said wiper means being piston rings disposed in said peripheral grooves.

8. A fluid metering device comprising
a body member,
means defining first and second axially aligned and communicating cavities in said body,
an axially movable poppet coaxially disposed within said first cavity,
    said poppet including a sleeve-like metering head in contiguous relation to said second cavity,
        said metering head having ring grooves on internal and external peripheries thereoof,
        wiper rings disposed in said grooves,
a cylindrical skirt coaxially retained within and in spaced relation from said first cavity,
axially tapered groove means in said body and in said cylindrical skirt,
    said grooves beginning in surfaces of said first cavity and said skirt adjacently spaced from said second cavity and tapering in depth in a direction remote from said second cavity,
    said wiper rings adapted to cover and uncover varying areas of said grooves when said poppet is moved axially,
separate passage means in said body communicating with opposite sides of said metering head, and
control means communicating with an end of said poppet opposite said metering head for controlling axial poppet positioning.

9. In a variable thrust device having a throat, a combustion chamber, a nozzle extending from the combustion chamber; a variable propellant injector, said injector comprising passage means communicating with the combustion chamber opposite the nozzle, a plurality of spaced lands disposed longitudinally within said passage means and forming a portion of said passage means, means defining a plurality of tapered grooves between said lands, said grooves being of a minimum depth at a position nearest the combustion chamber, a poppet movably disposed within said passage means, groove means in said poppet, wiper means spring retained in said groove means in spring contact with said lands, and means for adjustably controlling the longitudinal position of said poppet within said passage means.

10. In a variable thrust device according to claim 9, wherein said passage means is annular and said lands and grooves are disposed on either side thereof.

11. In a variable thrust device according to claim 9 wherein said passage means is annular and said lands and grooves are disposed on either side thereof and wherein said wiper means is a piston ring slidably contacting said lands.

12. In a variable thrust device according to claim 11 wherein cylindrical portions of said passage means are provided between the minimum depth of said groove means and said combustion chamber means, said cylindrical portions being of sufficient length to accept said piston rings in sealing relation thereon, whereby said rings prevent the passage of fluid between said rings and said cylindrical surfaces into said combustion chamber.

13. In a variable thrust device according to claim 11 wherein convergingly tapered guide means is provided as a portion of said passage means on either side thereof and wherein said poppet includes an extremity having tapered tips substantially matching said tapered guide means.

14. In a variable thrust rocket engine having a thrust chamber including an axially disposed body, means in the body defining a combustion chamber, means in the body defining propellant passage means leading from an external propellant source to the combustion chamber, a nozzle attached to and extending from the combustion chamber means, the nozzle extending substantially radially from said combustion chamber at a joinder thereto and subsequently curving into a more axial direction, adjustable exit throat means including a shaft disposed axially and concentrically with the body and being axially movable with respect thereto, a plug attached to and movable with the shaft, the plug being positioned within the nozzle and being of greater diameter than the joinder of the combustion chamber and the nozzle, whereby a throat is defined between the nozzle and the plug, actuator means upon the shaft for axially positioning the shaft and plug responsive to a signal from independent control means and adjusting the area of the throat, that improvement which comprises; a variable propellant injector means in the body, said injector having a plurality of concentrically disposed and alternately located lands and tapered groove means in said body in communication with said passage means, a sleeve like poppet surrounding said shaft positioned concentrically within said body and adapted for axial movement with respect to said lands and grooves, piston rings carried by said poppet and adapted for engagement with and movement over said lands, and means associated with said poppet for selectively positioning same.

References Cited by the Examiner

UNITED STATES PATENTS

| 2,106,300 | 1/1938 | Harrison | 137—625.3 |
| 2,574,851 | 11/1951 | Wagner | 137—625.3 |
| 2,649,273 | 8/1953 | Honegger | 251—118 X |
| 2,780,914 | 2/1957 | Ring | 60—35.6 |
| 2,810,259 | 10/1957 | Burdett | 60—35.6 |
| 2,870,603 | 1/1959 | Long | 60—35.6 |
| 2,957,307 | 10/1960 | Brandenberger et al. | 60—35.6 |
| 2,995,008 | 8/1961 | Fox | 60—39.48 X |
| 3,071,925 | 1/1963 | Ledwith et al. | 60—39.46 |
| 3,094,072 | 6/1963 | Parilla | 60—35.6 X |

FOREIGN PATENTS

| 680,718 | 10/1952 | Great Britain. |
| 148,576 | 10/1931 | Switzerland. |

MARK NEWMAN, *Primary Examiner.*

SAMUEL FEINBERG, ABRAM BLUM,
    SAMUEL LEVINE, *Examiners.*